No. 717,609. PATENTED JAN. 6, 1903.
L. PAGET.
STORAGE BATTERY ELECTRODE.
APPLICATION FILED JAN. 10, 1900.
NO MODEL.
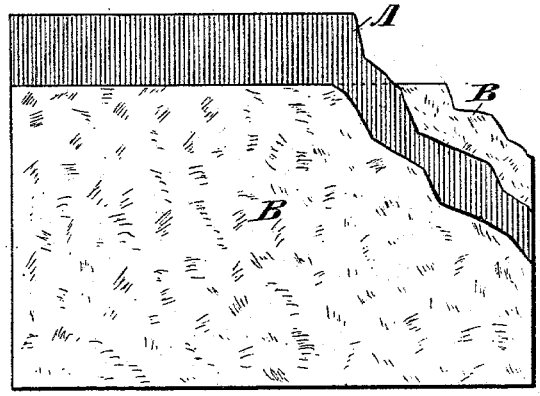
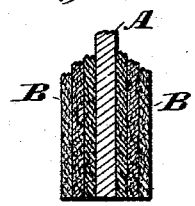

UNITED STATES PATENT OFFICE.

LEONARD PAGET, OF NEW YORK, N. Y., ASSIGNOR TO CHARLES COSTER, OF NEW YORK, N. Y.

STORAGE-BATTERY ELECTRODE.

SPECIFICATION forming part of Letters Patent No. 717,609, dated January 6, 1903.

Application filed January 10, 1900. Serial No. 911. (No model.)

*To all whom it may concern:*

Be it known that I, LEONARD PAGET, a citizen of the United States, residing at New York, county of New York, and State of New York, have invented certain new and useful Improvements in Storage-Battery Elements or Electrodes, fully described and represented in the following specification and the accompanying drawings, forming a part of the same.

The object of the present invention is to provide an improved battery element or electrode with a metal support and conductor for the active material which shall possess the advantages of a true Planté plate in respect to rapid charge and discharge and avoidance of sulfation between the active material and support and which shall be light, strong, and durable under the conditions of use, while at the same time avoiding the long period of formation required for producing plates by the Planté process.

I have discovered that by pressing spongy lead onto a plate of sheet-lead in a very thin layer and to the density of sheet-lead, which is 11.4, or approximately such density a storage-battery element may be secured that will not disintegrate under the action of a storage battery and will secure substantially the same battery action as the active material of a Planté plate, and I thus secure substantially a Planté plate of great durability without the slow and expensive process of forming by reversals, as in the Planté process. In producing my elements I may apply the spongy lead on only one side of the metallic-lead plate; but preferably I coat both sides of the metallic-lead plate with the spongy lead, thus producing a storage-battery plate with active material on opposite sides and a central metallic support and conductor. To secure the density required, each layer or film of metal produced by the compression must be very thin, so that only a comparatively small capacity per unit of surface can be secured without compressing successive layers. In compressing the spongy lead, therefore, I preferably apply and compress successive thin layers or films of the spongy lead, so as to produce the thickness of active material desired. Each of these successive compressed layers or films must be of such small thickness as to be compressed to a uniform density throughout, and I have found in practice that they should not be more than about two one-hundredths of an inch in thickness and preferably are thinner than this. I have found in practice that a direct pressure—that is, the pressure of a platen-press as distinguished from that of pressure-rollers—is necessary to secure the result desired and with a platen-press have found that a pressure of from two to three tons is sufficient to compress spongy lead in such thin layers to a specific gravity of ten or more and that by such compression on successive layers of this thickness a plate may be built up to the thickness desired that will be very satisfactory under conditions of battery use; but I preferably use a greater pressure, so as to secure a greater density with corresponding greater strength and durability. The density may be somewhat less and fairly satisfactory results be secured; but a specific gravity below ten involves loss of durability, and I find that if the specific gravity be less than about nine and one-half the element will be unsuitable for my purpose. If the spongy lead be applied on opposite sides of the plate for successive compressions, as is preferable, and the same pressure be used for the outer as for the inner layers, it is obvious that the plate will be of a density increasing from the surface inward, and this is the preferable construction and forms an important feature of my invention in its more limited aspect, as the plate thus produced resembles more closely a true Planté plate and secures more fully the advantages of such plate, especially in regard to the quicker charge and discharge and avoidance of sulfation. Instead of using the same pressure for the successive layers I may reduce the pressure for the successive layers and then press the plate finally with a heavier pressure, substantially the same result of a density increasing from the surface inward being secured. This increase of density is comparatively small and probably does not amount to one unit of specific gravity.

I preferably use the ordinary spongy lead in producing my battery electrodes or elements, by which I mean finely-granulated or electrolytically formed, reduced, or deposited metallic lead or chemically-precipitated metallic lead. All such metallic lead may be included under the term "finely-divided lead," and I find that with such material compressed to the density stated the active constituents of a suitable electrolyte will penetrate the material, so as to secure the electrical action required. I preferably use a very thin plate of sheet-lead as the central support and conductor, which is entirely practical with the increased rigidity secured by the solid coatings of heavily-compressed spongy lead, so that I am thus enabled to provide a very light and thin plate of large surface. I have found in practice that a plate of about one one-hundredth of an inch in thickness is efficient with the spongy lead applied on each side, so as to produce a plate of a total thickness of one-twelfth of an inch or less. Of course a thicker support may be used and the same action of the battery be secured; but this increases the weight and thickness of the plate without increasing the battery capacity, and one of the important advantages of my improved plate is that it enables a very thin support and conductor to be used. The total thickness of active material on either side of the central lead plate or on one side, if only one side be coated, should not exceed about one twenty-fifth of an inch in order that the whole depth of the coating or coatings may be efficiently utilized as active material in the battery, so as to secure a high capacity per unit of weight.

For a full illustration of the features of the present invention I have shown in the accompanying drawings a storage-battery element in the form of a plate consisting of a central thin plate of ordinary sheet-lead forming the support and conductor and a coating of spongy lead on the opposite sides of the plate compressed as above described and forming the active material of the plate.

In the drawings, Figure 1 is a face view of the plate broken away to show the different layers. Fig. 2 is an edge view of the same. Fig. 3 is a detail cross-section on a much-enlarged scale, illustrating the preferred construction with successive layers of different density.

A is the central lead plate, forming the support and conductor, and B the coatings of compressed spongy lead on opposite sides of the plate A, these coatings preferably consisting of a number of successive thin layers or films compressed as above described and the coatings preferably increasing in density from the surface inward to the plate A, as illustrated in Fig. 3.

It will be understood that my improved storage-battery element may be of any suitable form other than a simple plate of the form shown and that it may be used with any suitable electrolyte and in any desired manner, as usual with other electrodes in which lead forms the active material or material adapted to become active, as well understood in the art. Instead of a support of sheet-lead other suitable metal may be used to form a conducting-support, but much better results are secured with the lead plate.

What I claim is—

1. A storage-battery element consisting of a conducting-support and finely-divided lead on said support compressed to a density approximately that of sheet-lead, substantially as and for the purpose set forth.

2. A storage-battery element consisting of a conducting-support and finely-divided lead on opposite sides of said support compressed to a density approximately that of sheet-lead, substantially as and for the purpose set forth.

3. A storage-battery element consisting of a conducting-support and finely-divided lead on said support compressed to a density approximately that of sheet-lead with the density of the compressed lead increasing from the surface inward, substantially as and for the purpose set forth.

4. A storage-battery element consisting of a conducting-support and finely-divided lead on opposite sides of said support compressed to a density approximately that of sheet-lead with the density of the compressed lead increasing from the surface inward, substantially as and for the purpose set forth.

5. A storage-battery element consisting of a conducting-support and finely-divided lead on said support in successive thin layers or films compressed to a density approximately that of sheet-lead, substantially as and for the purpose set forth.

6. A storage-battery element consisting of a conducting-support and finely-divided lead on opposite sides of said support in successive thin layers or films compressed to a density approximately that of sheet-lead, substantially as and for the purpose set forth.

7. A storage-battery element consisting of a conducting-support and finely-divided lead on said support in successive thin layers or films compressed to a density approximately that of sheet-lead with the density of the compressed lead increasing from the surface inward, substantially as and for the purpose set forth.

8. A storage-battery element consisting of a conducting-support and finely-divided lead on opposite sides of said support in successive thin layers or films compressed to a density approximately that of sheet-lead with the density of the compressed lead increasing from the surface inward, substantially as and for the purpose set forth.

9. A storage-battery element consisting of a lead plate and finely-divided lead on said plate compressed to a density approximately that of sheet-lead, substantially as and for the purpose set forth.

10. A storage-battery element consisting of a lead plate and finely-divided lead on each side of the plate compressed to a density approximately that of sheet-lead, substantially as and for the purpose set forth.

11. A storage-battery element consisting of a lead plate and finely-divided lead on said plate compressed to a density approximately that of sheet-lead with the density of the compressed lead increasing from the surface inward, substantially as and for the purpose set forth.

12. A storage-battery element consisting of a lead plate and finely-divided lead on each side of the plate compressed to a density approximately that of sheet-lead, with the density of the compressed lead increasing from the surface inward, substantially as and for the purpose set forth.

13. A storage-battery element consisting of a thin lead plate and a coating of finely-divided lead in successive thin layers or films on said plate compressed to a density substantially that of sheet-lead, substantially as and for the purpose set forth.

14. A storage-battery element consisting of a thin lead plate and a coating of finely-divided lead on each side of said plate in successive thin layers or films on said plate compressed to a density substantially that of sheet-lead, substantially as and for the purpose set forth.

15. A storage-battery element consisting of a thin lead plate and a coating of finely-divided lead in successive thin layers or films on said plate compressed to a density substantially that of sheet-lead with the density of the coating increasing from the surface inward, substantially as and for the purpose set forth.

16. A storage-battery element consisting of a thin lead plate and a coating of finely-divided lead on each side of said plate in successive thin layers or films on said plate compressed to a density substantially that of sheet-lead with the density of the coatings increasing from the surface inward, substantially as and for the purpose set forth.

17. A storage-battery element consisting of a conducting-support and finely-divided compressed lead on said support with the density of the compressed lead increasing from the surface inward.

18. A storage-battery element consisting of a conducting-support and finely-divided lead on said support in successive compressed thin layers or films.

19. A storage-battery element consisting of a conducting-support and finely-divided lead on said support in successive compressed thin layers or films with the density of the compressed lead increasing from the surface inward.

20. A storage-battery element consisting of a thin lead plate and a coating of finely-divided lead on each side of said plate in successive compressed thin layers or films.

21. A storage-battery element consisting of a thin lead plate and a coating of finely-divided lead on each side of said plate in successive compressed thin layers or films with the density of the coatings increasing from the surface inward.

In testimony whereof I have hereunto set my hand in the presence of two subscribing witnesses.

LEONARD PAGET.

Witnesses:
A. A. V. BOURKE,
C. J. SAWYER.